Patented Jan. 18, 1949

2,459,725

UNITED STATES PATENT OFFICE 2,459,725

PREPARATION OF DI(HYDROXY METHYL) DITHIOBIURET

Russell L. Sperry, Glendora, Calif., assignor to American Cyanamid Company, New York, N. Y., a corporation of Maine No Drawing. Application December 6, 1946, Serial No. 714,653

3 Claims. (Cl. 260—552)

The present invention relates to di(hydroxy methyl) dithiobiuret and to a method of preparing the same.

The invention is particularly concerned with the preparation of that material from dithiobiuret and either formaldehyde or paraformaldehyde.

Dithiobiuret may be prepared according to the method disclosed in U. S. Patent No. 2,371,112.

Example 1

A slurry of 5 grams (0.037 mol) of dithiobiuret and 9 cc. (0.12 mol formaldehyde) of 37% formaldehyde solution in 10 cc. of water was warmed on a steam bath for 30 minutes. A clear yellow solution was formed. The solution was evaporated to dryness and dried in a vacuum desiccator. 6.5 grams of a yellow powder, identified as di(hydroxy methyl) dithiobiuret, was obtained in a yield of 90%.

Example 2

Example 1 was repeated using, however, an equivalent amount of paraformaldehyde with similar results.

The product is useful as an intermediate and has insecticidal properties.

While the invention has been described with particular reference to specific embodiments, it is to be understood that it is not to be limited thereto but it is to be construed broadly and restricted solely by the scope of the appended claims.

I claim:

1. 1,5 Di(hydroxy methyl) dithiobiuret.
2. The method of making 1,5-di(hydroxymethyl) dithiobiuret which comprises reacting dithiobiuret with a solution of a material chosen from the group consisting of formaldehyde and paraformaldehyde in the ratio of at least two moles of said material to one mole of dithiobiuret, said reaction being conducted at substantially 100° C.
3. The method of making 1,5-di(hydroxymethyl) dithiobiuret which comprises reacting dithiobiuret with formaldehyde solution in the ratio of at least three moles of said material to one mole of dithiobiuret at substantially 100° C., and recovering di(hydroxymethyl) dithiobiuret from the solution.

RUSSELL L. SPERRY.

REFERENCES CITED

The following references are of record in the file of this patent:

UNITED STATES PATENTS

| Number | Name | Date |
| --- | --- | --- |
| 1,699,245 | Luther et al. | Jan. 15, 1929 |
| 2,371,112 | Sperry | Mar. 6, 1945 |
| 2,378,110 | Simons et al. | June 12, 1945 |

OTHER REFERENCES

Fromm, "Liebigs Annalen," vol. 394 (1912), page 283.